Dec. 24, 1935.                    B. R. SHEETS                       2,025,551
                         FEEDING MECHANISM FOR ROCK DRILLS
                              Filed Aug. 9, 1935            4 Sheets-Sheet 1
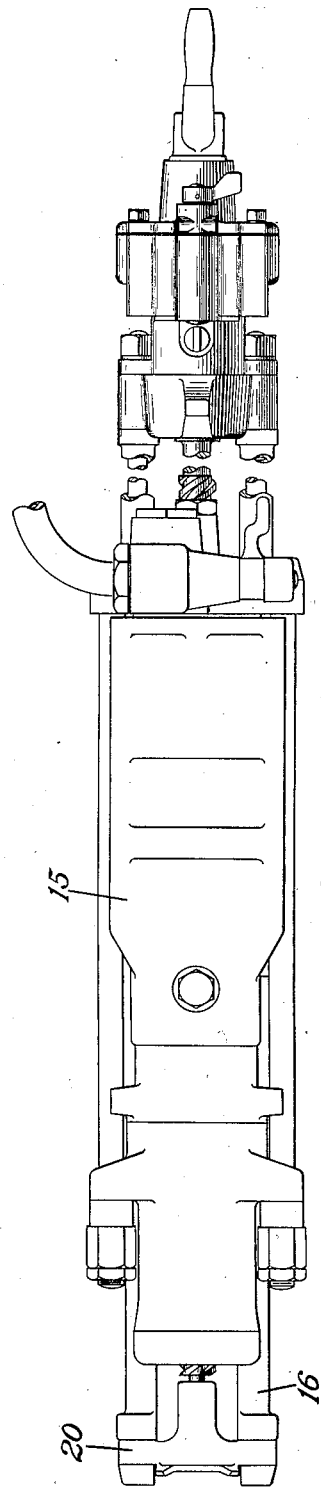
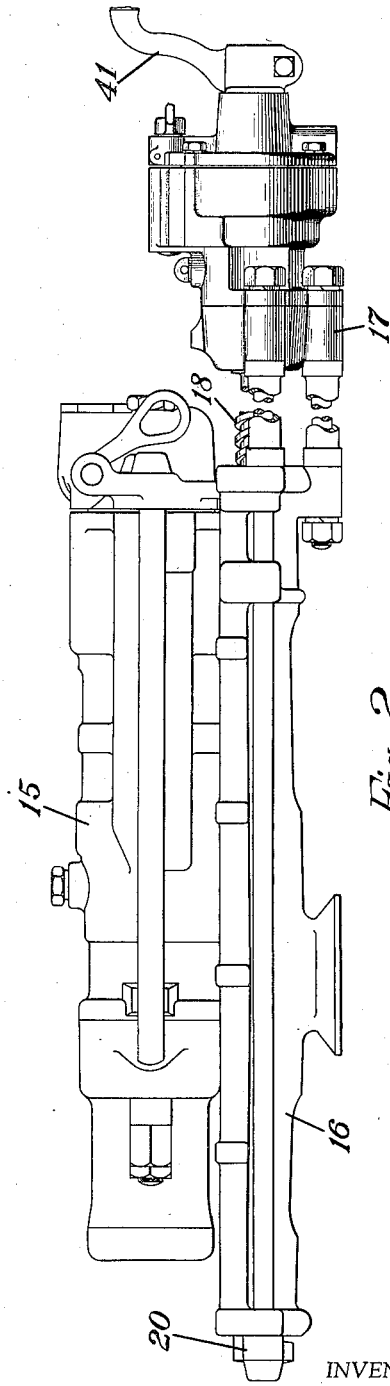
INVENTOR.
Barton R. Sheets
BY
J. S. Carpenter
ATTORNEY.

Dec. 24, 1935.          B. R. SHEETS          2,025,551
FEEDING MECHANISM FOR ROCK DRILLS
Filed Aug. 9, 1935          4 Sheets-Sheet 2

INVENTOR.
Barton R. Sheets
BY
ATTORNEY.

Dec. 24, 1935.    B. R. SHEETS    2,025,551

FEEDING MECHANISM FOR ROCK DRILLS

Filed Aug. 9, 1935    4 Sheets-Sheet 3

INVENTOR.
Barton R. Sheets
BY
*J. S. Carpenter*
ATTORNEY.

Patented Dec. 24, 1935

2,025,551

UNITED STATES PATENT OFFICE 2,025,551

FEEDING MECHANISM FOR ROCK DRILLS

Barton R. Sheets, Denver, Colo., assignor to Gardner-Denver Company, Denver, Colo., a corporation of Delaware Application August 9, 1935, Serial No. 35,442

3 Claims. (Cl. 255—45)

This invention relates to improvements in feeding mechanisms for rock drills, and is more particularly directed to means for moving a rock drilling motor to and from its work either manually or automatically.

The main object of the invention is to provide a simple device which might be mounted upon the guide shell of the drill and designed to cooperate with a feed screw to move the drill to and from its work.

Another object of the invention is to provide manually operated means for moving a rock drill longitudinally of the guide shell, said means causing the drill to move at a speed customary with the usual hand crank, or differing therewith.

It is also another object of the invention to provide manually operated means for moving the drill to and from its work, said means being constructed in such a manner as to permit the feeding of the drill in one direction through the medium of the feed screw, while movement in the opposite direction is accomplished by merely grasping the drill and sliding it in the guide shell.

Another important object of the invention is to provide in combination with this manually operated mechanism a second mechanism so constructed as to utilize the force of the reciprocating hammer for advancing the drill relatively to its support. This second mechanism being under the control of the operator so as to permit either forward or backward movement of the drill, to lock the drill against movement or to free the drill so that it might be moved by hand upon the support.

Other objects of the invention will be obvious and pointed out hereinafter.

The accompanying drawings illustrate one form of the invention and in which similar reference characters refer to similar parts.

Figure 1 is a top plan view of a rock drill mounted upon the usual guide shell, the latter having connected thereto the improved mechanism for moving the drill upon the support.

Figure 2 is a side elevation of Figure 1.

Figure 6:
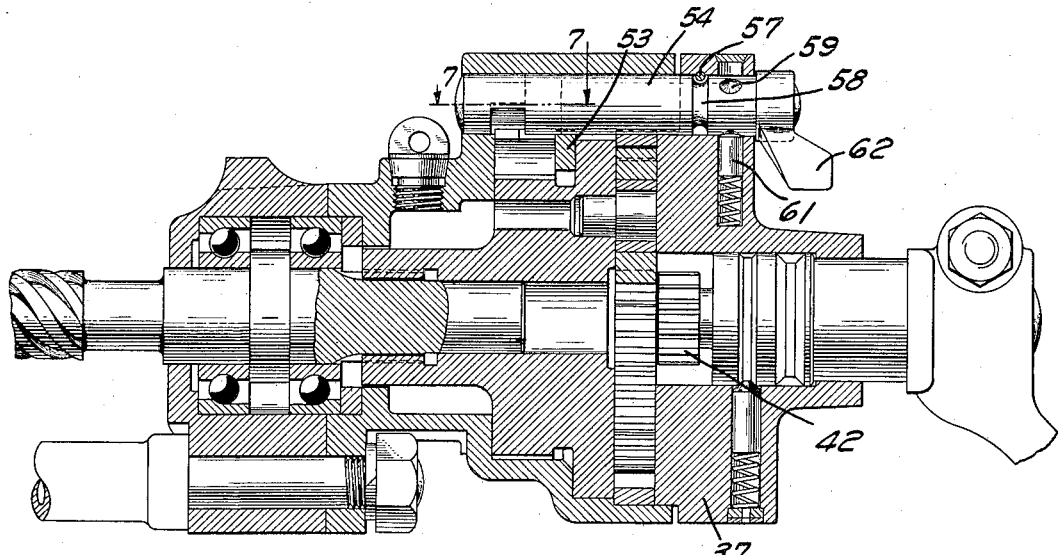
Figure 6 is a vertical sectional view taken through the longitudinal center of the feeding mechanism, somewhat similar to Figure 3, but showing the controlling element for the pawls in another of its operating positions, and the crank element disengaged from the gear mechanism.
Figure 11:
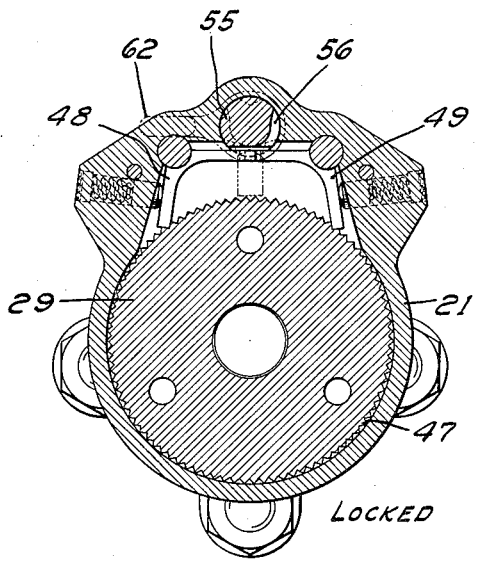
Figure 11 is a sectional view taken on the line 11—11 of Figure 3 showing the controlling element in a position whereby both pawls engage the ratchet element locking the drill against movement upon its support.
Figure 12:
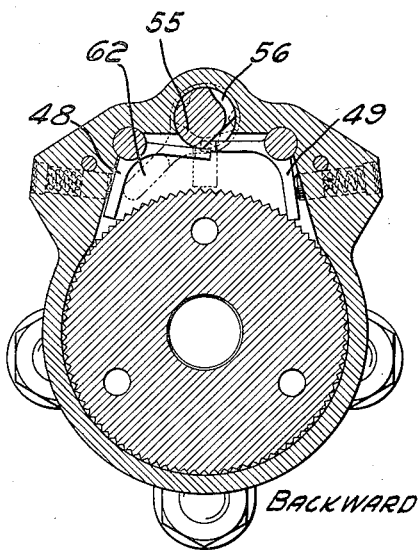
Figure 12 is a sectional view similar to Figure 11 showing the position occupied by the pawl controlling element and pawls permitting the automatic movement of the drill in a backward direction upon the support.
Figure 13:
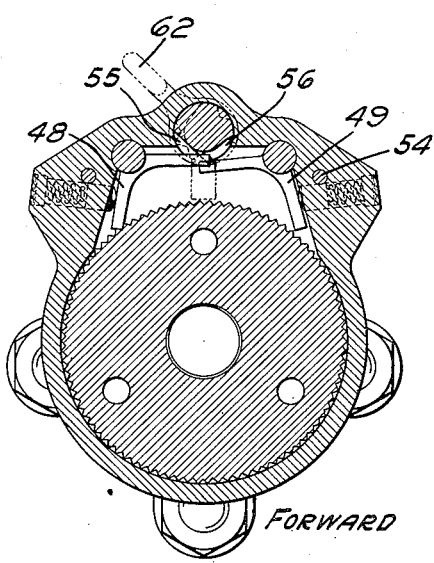
Figure 14:
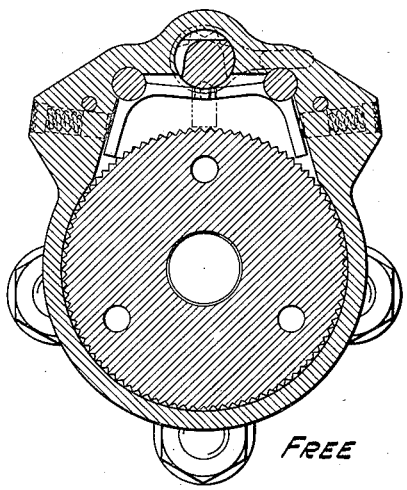

Figure 13 is still another view similar to Figure 11 showing the controlling element and pawls in another of their functioning positions permitting movement of the drill in a direction reverse to that shown in Figure 12, and Figure 14 is a similar view showing the controlling element moved to its fourth functioning position whereby both pawls are disengaged from the ratchet element permitting the drill to be moved longitudinally upon the support either manually through the cranking mechanism, or when the crank is disengaged as shown in Figure 6, permitting the operator to grasp the drill and slide it back and forth upon the support.

Briefly, the invention about to be described relates to a feeding mechanism for rock drills, whereby the drill is moved longitudinally upon its support, either manually or by automatic means influenced upon the movement of the usual piston hammer contained within the drill. The manually operated means is so designed as to permit movement of the drill upon the guide shell, the result being that the drill is properly maintained in its true relation with its work with a minimum effort upon the part of the operator, also by disengagement of the hand crank the operator might grasp the drill and move it longitudinally upon the support, thus reducing the time interval in moving the drill to and from its work.

In combination with this mechanism applicant has provided a simple means whereby the drilling motor is moved longitudinally upon its support under the influence of the force exerted during the movement of the piston hammer. This mechanism includes a ratchet ring and a pair of opposed pawls engageable therewith, the pawls being controlled through the medium of a control bar so as to permit the movement of the drill in opposite directions upon the support, the locking of the drill against movement and the disengagement of both pawls from the ratchet ring permitting free movement of the drill upon the support. This latter position being assumed during the operation of the cranking device incorporated with the mechanism or at such periods as when the operator might desire to move the drill freely upon the support.

The embodiment shown in the drawings is merely one form of the invention, and it is, of course, understood that modifications and improvements might be made thereupon within the scope of the invention, but the fact that applicant has incorporated an automatic feeding mechanism in combination with a cranking mechanism for rock drills is believed to be entirely new in the art.

Referring more particularly to the accompanying drawings, the numeral 15 designates a rock drill motor of any desired type which is slidably mounted in a guide shell 16. The drilling motor 15 is of the usual structure and includes a reciprocating hammer adapted to deliver impact blows against a suitable working implement mounted in the nose of the unit. The hammer and the working implement being generally understood in the art are omitted from the drawings.

The guide shell 16 carries the usual guide ways which slidably receive ribs carried by the drilling motor and the rear end of the shell having an extension which includes a yoke element 17 forming one part of the mechanism hereinafter to be described.

To move the drilling motor 15 longitudinally upon the support there is provided the usual feed screw 18 having threads 19 preferably of a fast pitch to engage corresponding threads formed in a feed nut secured within a depending boss carried by the drilling motor. The ends of the feed screw 18 being freely mounted for rotation within the rear yoke element 17 and a front yoke element 20.

Such constitutes in general a drifting drill mounted upon a support and adapted to be moved longitudinally thereupon in either direction by the rotation of the feed screw.

Figure 3:
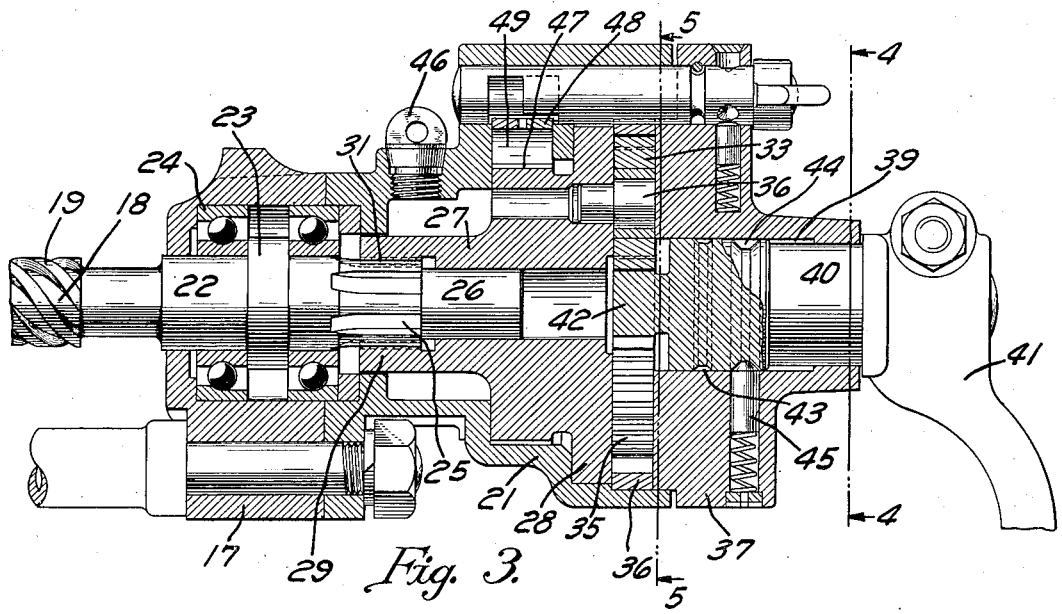
Figure 3 is a vertical sectional view taken through the center of the feeding mechanism showing certain parts thereof in elevation.
Figure 4:
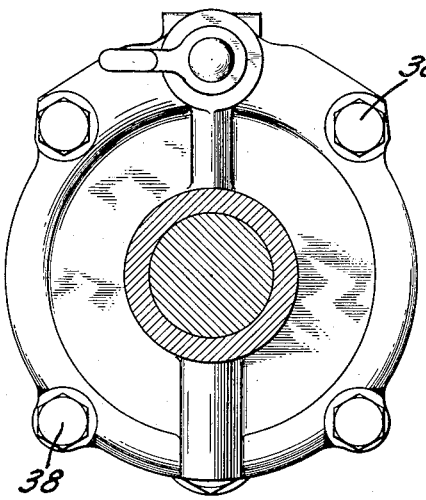
Figure 4 is a sectional view taken on the line 4—4 of Figure 3.
Figure 5:
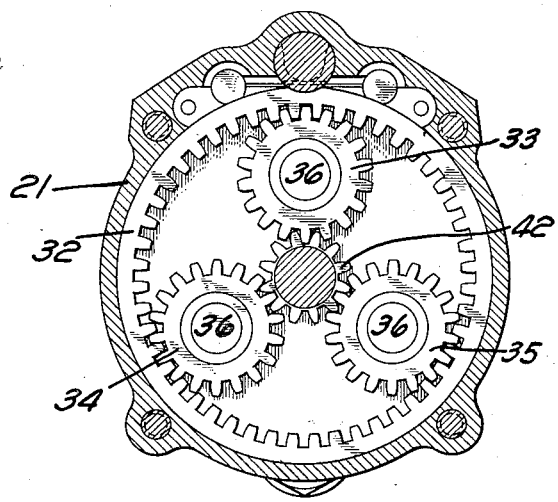
Figure 5 is a sectional view taken on the line 5—5 of Figure 3.

To provide for the rotation of the feed screw, the rear end of the screw 18 is extended, as illustrated in Figure 3, and lies within a suitable housing 21 abutting the yoke 17 and retained thereagainst by the usual tie rods of the guide shell extension. Within this housing, and yoke member 17, the extending end of the feed screw is enlarged as shown at 22 and provided midway of its length with an outwardly extending flange 23, upon each side of which is arranged a ball bearing cage 24 reducing to a minimum the friction of the rotating shaft within the housing. The rear end of the enlarged portion 22 being provided with a series of longitudinal slots 25, while its extreme end 26 fits within the hub portion 27 of a gear element 28, having a front extending sleeve 29 provided with internal ribs 31 interlocking with the slots 25 formed upon the enlarged portion 22 of the feed screw. In this manner the gear element 28 rotates upon rotary movement of the feed screw, and likewise during the period that the element 28 rotates, the feed screw is accordingly rotated.

The gear element 28 is contained within the housing 21 and fitted within this housing and concentrically with the gear element 28 is a stationary internal gear 32 engageable by pinions 33, 34 and 35 rotatably mounted upon pins 36 fitted within the rear face of the gear element 28. Closing the open end of the housing 21 is a back head 37 maintained in position by suitable stud bolts 38.

The back head 37 has rotatably mounted therein, within a bore 39 concentrically arranged with the end of the feed screw 18, a stub shaft 40 having mounted upon its rear end a suitable crank 41 while its front end has formed integral therewith a spur gear 42 selectively meshing with the gears 33, 34 and 35 forming a planetary gear arrangement, whereby upon the turning of the hand crank 41 motive power is transmitted through the planetary gears to the end of the feed screw, rotating the same in the direction desired.

That portion of the stub shaft 40 movable within the bore 39 is provided with annular grooves 43 and 44 both being engageable by a spring pressed plunger 45 serving to lock the shaft in either of its two functioning positions. Upon referring to the drawings it will be observed that the annular groove 44 is somewhat larger than the groove 43, its purpose being to provide a suitable bearing area for the front end of the plunger 45 during that period when the stub shaft is connected to the planetary gear unit and subject to rotation.

The front end of the housing 21 is provided in its upper portion with an oil port, closed by a suitable plug 46, through which oil or grease is injected to lubricate the various elements contained within the housing.

With the mechanism just described and more particularly disclosed in Figure 3, it will be apparent that when the crank shaft 40 is in the position shown, rotary movement of the shaft will cause the feed screw to rotate, through the gears 42, 33, 34, 35, gear ring 32 and gear element 28 at a corresponding speed in the direction desired, and inasmuch as the drilling motor 15 is threadedly connected to the feed screw movement of the drilling motor upon its support occurs.

Assuming that the operator has been feeding the drilling motor forward to drill a hole in the work and that the hole has been completed or a change of steel is necessary, the operator either turns the crank handle in the reverse direction to back the drill or pulls the handle 41, together with the stub shaft 40, backward, thus disengaging the spur gear 42 from the planetary gears 33, 34 and 35 permitting the detent plunger 45 to drop within the annular groove 43, locking the stub shaft 40 in its rearmost position, then grasping the drill pulling the same backward upon the guide shell.

Figure 7:
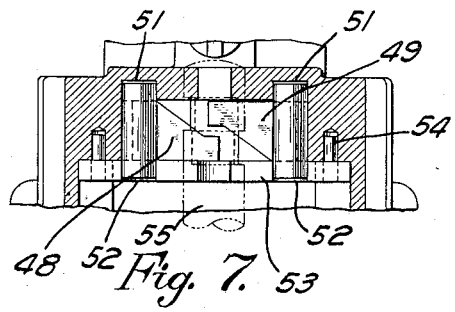
Figure 7 is a sectional view taken on the line 7—7 of Figure 6 and shows in general the manner of mounting the ratchet engaging pawls and the control element cooperating therewith.
Figure 10:
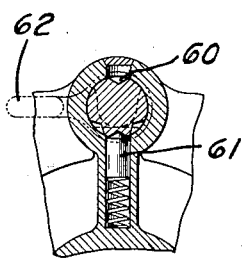
Figure 10 is a detail of the locking means for the pawl controlling element.
Figure 8:
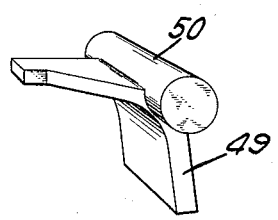
Figure 8 is a perspective view of one of the two pawls used.

In conjunction with the mechanism just described there is provided automatic means for moving the drill longitudinally of its support, said means including the gear element 28 which is provided with ratchet teeth 47 about the periphery of a reduced portion, said teeth being engageable by spring pressed pawls 48 and 49, each pawl being formed substantially in a manner similar to that disclosed in Figure 8 and each including a ratchet engaging portion and an operating lever arranged at right angles to each other with a pintle 50 formed at their junction. The ends of the pintle extend beyond the pawl and as shown in Figure 7 the front end of each pintle is receivable within a socket 51 formed within the inner face of the front wall of the housing 21, while the rear end of each pintle rests within a half-moon 52 formed in the upper edge of a cross bar 53 pinned as at 54 to the inner face of the housing wall. As shown in Figure 7 the pawls are reversely arranged so that the operating lever of each will be positioned beneath an oscillatory control bar 55 fitted within aligned bores in the housing 21 and the back head 37.

Figure 9:
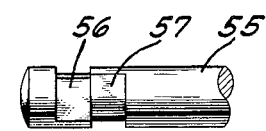
Figure 9 is a fragmentary view of the controlling element showing in detail the cams carried thereby and used to move the pawls with respect to the ratchet element.

As shown in Figure 9 the controlling bar 55 has adjacent its front end a pair of correspondingly formed but reversely arranged cams designated as 56 and 57, each cam being engageable by the operating lever of the pawl positioned thereunder, thus the cam 56 will control the movement of pawl 49, while the cam 57 will control pawl 48. The controlling bar 55 is maintained in place by a locking pin 58 carried by the back head 37 and receivable within an annular groove 59 formed in its periphery. To maintain the control bar in any one of its several functioning positions the front end of the bar is provided, about its periphery, with a series of depressions indicated at 60, any one of which may receive therein the end of a spring pressed plunger 61. To move the controlling bar 55 to its several functioning positions there is provided an operating handle 62.

It is, of course, understood that during the operation of the automatic feeding mechanism the stub shaft 40 is moved outwardly so as to disengage the spur gear 42 carried thereby from the remaining gears of the planetary unit, thus permitting free movement of the feed screw or only such movement as may be controlled due to the positions occupied by the pawls.

In Figures 11, 12, 13 and 14 there is disclosed briefly the various operating positions as assumed by the pawls 48 and 49 when moved by the control bar 55. Referring now particularly to Figure 11 is will be observed that both pawls are shown as engaging the ratchet element. In this position rotation of the feed screw in either direction is prevented thus locking the drill against movement.

Figure 12 illustrates the position assumed by the pawls when the drill is moved under the influence exerted by the movement of the piston hammer and particularly in a backward direction. In this position it will be observed that the operating handle 62 is pressed downwardly thus oscillating the control bar 55 and causing the cam 57 to depress the operating lever of pawl 48, while the cam 56 permits the operating lever of the pawl 49 to remain in its uppermost position, thus allowing the pawl 49 to engage the ratchet element. With the pawl 49 in this position the feed screw 18 is locked against anti-clockwise movement but is free to move in a clockwise movement, permitting the drill to move backward upon the feed screw.

Figure 13 discloses the positions occupied by the pawls when permitting the forward movement of the drill under the influence of the piston hammer movement. The position occupied by the pawls is just the reverse to that shown in Figure 12. Movement of the control bar 55 to its third functioning position permits the cam 56 to depress the pawl 49, while the cam 57 permits the pawl 48 to engage the ratchet element 28.

Figure 14 discloses a fourth operating position as assumed by the control bar and pawls. In this position the control bar is oscillated to depress both of the operating levers of the pawls 48 and 49, causing the pawls to disengage the ratchet element and permit free rotation of the feed screw in either direction. This is the position occupied by the pawls when the drill is moved by hand either through the cranking mechanism, previously described, or by the common expedient of grasping the drill and pulling it back and forth upon the feed screw.

From the foregoing it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim is:—

1. The combination with a support and a percussive drill slidably mounted thereon, said support including a feed screw rotated by manual means for moving the drill thereupon, said manual means including a gear element, automatic means for moving the drill upon the support independent of the manual means, said automatic means including said gear element rotatable by vibrations of the drill during its working period, and means for selectively connecting either one of said operating means with the feed screw.

2. The combination with a support and a percussive drill slidably mounted thereon, said support including a rotatable feed screw for moving the drill thereupon, a gear fixed to the screw, manually operated means mounted upon the support and engaging the gear for rotating said screw, automatic means for rotating the screw independent of the manual means, said automatic means including said gear element rotatable by vibrations of the drill during its working period, and means for selectively controlling the direction of rotation of the feed screw when rotated by the automatic means.

3. The combination with a support and a percussive drill slidably mounted thereon, a rotatable member mounted upon the support and connected to the drill for moving the same thereupon, a gear element connected to the rotatable member, manually operated means, engageable with the gear element for rotating said member, automatic means for rotating said member independent of said manual means, said automatic means including said gear element rotatable by vibrations of the drill during its working period, and means for connecting either of said operating means to said gear element and the directional operation of one of said operating means.

BARTON R. SHEETS.